United States Patent Office 2,912,444
Patented Nov. 10, 1959

2,912,444

PROCESS OF PREPARING 17-HYDROXY-20-KETOSTEROIDS

Gustav Ehrhart and Heinrich Ruschig, Bad Soden (Taunus), and Josef Schmidt-Thomé, Werner Haede, and Werner Fritsch, Frankfurt am Main, Germany, assignors to Farbwerke Hoechst A.G., vormals Meister Lucius & Brüning, Frankfurt am Main Hochst, Germany, a company of Germany No Drawing. Application October 20, 1953
Serial No. 387,302

Claims priority, application Germany October 25, 1952

14 Claims. (Cl. 260—397.4)

The present invention relates to a novel process of general applicability for the transformation of 16:17-oxido-20-ketosteroids to the corresponding 17-hydroxy-20-ketosteroids.

It is known that 16-bromo-Δ⁴-pregnene-17:21-diol-3:20-dione-21-acetate can be obtained by addition of hydrogen bromide to the corresponding 16:17-oxido-compound and that the bromhydrin is converted by reduction into Δ⁴ - pregnene - 17:21 - diol - 3:20 - dione - 21 - acetate (acetate of substance S) [Julian et al., Journal of the American Chemical Society, volume 72 (1950), page 5145].

However, since this process has various drawbacks it cannot be applied generally. The reaction cannot be applied, for instance, to steroids containing double bonds which may add hydrogen halide. From 16:17-oxido-Δ⁵-pregnene-3β-ol-20-one-acetate, for instance, there is obtained by a smooth reaction under the influence of hydrogen bromide a dibromine compound melting at 158° C.–161° C. (with decomposition) according to the following scheme

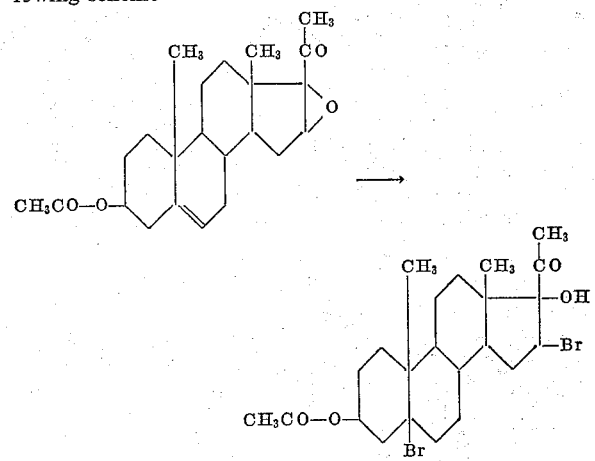

Side reactions, such as a partial acetylation, also take place in the presence of free hydroxyl groups if hydrogen bromide is employed in glacial acetic acid under the conditions mentioned above so that mixtures of compounds are obtained which have first to be separated.

Furthermore, only moderate yields are obtained when exchanging the bromine in 16-position by hydrogen. In addition, the reducing agent has to meet great requirements with regard to kind and quality.

Now we have found that 17-hydroxy-20-ketosteroids are obtained in good yields if 16:17-oxido-20-ketosteroids are reacted, if necessary in the presence of solvents, with salts of the hydrogen iodide and organic acids and the iodohydrins thus obtained are transformed by reduction into 17-hydroxy-20-ketosteroids.

This is surprising in so far as it is known from the literature that, when reacting hydrogen iodide with α,β-oxido-ketones, there are not obtained the corresponding iodohydrins but unsaturated ketones are formed with elimination of the oxido-oxygen atom:

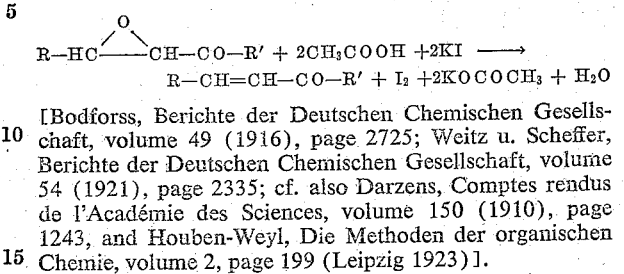

[Bodforss, Berichte der Deutschen Chemischen Gesellschaft, volume 49 (1916), page 2725; Weitz u. Scheffer, Berichte der Deutschen Chemischen Gesellschaft, volume 54 (1921), page 2335; cf. also Darzens, Comptes rendus de l'Académie des Sciences, volume 150 (1910), page 1243, and Houben-Weyl, Die Methoden der organischen Chemie, volume 2, page 199 (Leipzig 1923)].

The reaction according to the present invention may generally be applied. It may be applied to steroids containing at other places of the molecule protected or unprotected hydroxyl groups or other substituents, such as keto- or aldehyde groups.

As 16:17-oxido-20-ketosteroids there come into consideration, for instance, 16:17-oxido-Δ⁵-pregnene-3β-ol-20-one-acetate, 16:17-oxido-Δ⁵-pregnene-3β-ol-20-one, 16:17-oxido - Δ⁴ - pregnene - 21 - ol - 3:20 - dione - acetate, 16:17 - oxido - progesterone, 16:17 - oxido - Δ⁵ - pregnene - 3β:21 - diol - 20 - one - diacetate, 16:17 - oxido-allo - pregnane - 3β:21 - diol - 20 - one - diacetate, 16:17-oxido - pregnane - 3α:21 - diol - 20 - one - diacetate, 16:17 - oxido - pregnane - 3α - ol - 20 - one - acetate, 16:17 - oxido - allo - pregnane - 3β - ol - 20 - one - acetate, 16:17 - oxido - Δ⁴ - pregnene - 11α - ol - 3:20 - dione, 16;17 - oxido - pregnane - 3α:21 - diol - 11:20 - dione-21-acetate, and the like.

As organic acids there may be used such acids as liberate hydrogen iodide from its salts even if only in minor concentration or in traces, such as carboxylic acids or sulfonic acids. Lower aliphatic carboxylic acids such as formic acid, acetic acid, propionic acid, and the like are particularly suitable. As sulfonic acids there may be mentioned para-toluene sulfonic acid and the like.

As salts of hydrogen iodide come into consideration those which are sufficiently soluble in the solvents used. This applies above all to iodides of alkali and alkaline earth metals such as sodium iodide, potassium iodide, calcium iodide etc.

As solvents may serve the acids used in the process of the present invention or organic solvents, such as lower molecular alcohols, dioxane or ketones such as acetone, also in mixture with water, provided they are able to dissolve the iodides used, even if only to a small extent.

The iodine in the iodohydrin formed is replaced by hydrogen in known manner, advantageously by catalytic reduction [Busch, Stöve, Berichte der Deutschen Chemischen Gesellschaft, volume 49 (1916), page 1063; Visscher, Reichstein, Helvetica Chimica Acta, volume 27 (1944), page 1335; Julian et al., Journal of the American Chemical Society, volume 72 (1950), page 5146; Kendall et al., Journal of Biological Chemistry, volume 194 (1952), page 244].

The compounds obtained according to the process of the present invention are adrenal cortical hormones or can be used as intermediate products for the manufacture of such hormones.

The following examples serve to illustrate the invention but they are not intended to limit it thereto.

*Example 1*

1 gram of 16:17-oxido-Δ⁵-pregnene-3β-ol-20-one-acetate, 15 cc. of glacial acetic acid, and 5 grams of sodium iodide are heated for 1½ hours at 100° C. The mixture is poured into 200 cc. of water and extracted with ether. The ether solution is washed, for decolorisation of the iodine, with thiosulfate solution, then washed with sodium carbonate solution and water, and finally dried with sodium sulfate. After distilling off the ether, the residue is recrystallised from aqueous alcohol. There are obtained 1.17 grams of 16-iodo-$\Delta^5$-pregnene-$3\beta$:$17\alpha$-diol-20-one-$3\beta$-acetate melting at 184° C.

16-iodo-$\Delta^5$-pregnene-$3\beta$:$17\alpha$-diol-20-one-$3\beta$-acetate can likewise be obtained in a good yield if it is prepared in the following manner:

0.4 gram of 16:17-oxido-$\Delta^5$-pregnene-$3\beta$-ol-20-one acetate are heated, for one hour at 100° C., with 0.8 gram of calcium iodide in 2 cc. of glacial acetic acid, while shaking occasionally. The mixture is worked up in the same manner as described above. Or, 0.4 gram of 16:17-oxido-$\Delta^5$-pregnene-$3\beta$-ol-20-one-acetate are heated, for one hour at 100° C. with 0.8 gram of calcium iodide in 2 cc. of isobutyric acid, while shaking occasionally, and worked up in the manner as described above.

2 grams of 16-iodo-$\Delta^5$-pregnene-$3\beta$,$17\alpha$-diol-20-one-$3\beta$-acetate are boiled for 2 hours under reflux, while stirring, in 80 cc. of ethanol with 8 grams of Raney nickel. After cooling, there are added 100 cc. of methylene chloride, and the catalyst is removed by filtration. On concentrating to a few cubic centimetres, 1.4 grams of $\Delta^5$-pregnene-$3\beta$:$17\alpha$-diol-20-one-$3\beta$-acetate are obtained which, after recrystallization from ethanol-acetone, melt at 232° C. (on the Kofler heating bench).

Instead of with Raney nickel, the reduction can also be carried out in the following manner: 0.25 gram of 16-iodo-$\Delta^5$-pregnene-$3\beta$,$17\alpha$-diol-20-one-$3\beta$-acetate in 25 cc. of pure ethanol are shaken under atmospheric pressure with hydrogen and with 750 milligrams of a 2 percent prehydrogenated palladium-calcium carbonate-catalyst. The theoretical amount of hydrogen is taken up within 1 hour. The catalyst is filtered off and the solution is concentrated to a few cubic centimeters. After spraying with water, 180 milligrams of $\Delta^5$-pregnene-$3\beta$,$17\alpha$-diol-20-one-$3\beta$-acetate crystallize.

*Example 2*

1 gram of 16:17-oxido-$\Delta^5$-pregnene-$3\beta$-ol-20-one is heated, for one hour at 100° C., with 4 grams of sodium iodide in 10 cc. of glacial acetic acid. After pouring the reaction mixture into water, the precipitate is filtered off with suction and washed with a dilute thiosulfate solution. The crude product dried in a desiccator is dissolved in methylene chloride, the solution is concentrated to two cubic centimeters, and 5 cc. of ether are added. 1.11 grams of 16-iodo-$\Delta^5$-pregnene-$3\beta$:$17\alpha$-diol-20-one crystallize which melt at 226° C.–230° C. (on the Kofler heating bench).

0.4 gram of the iodohydrin obtained are hydrogenated in 50 cc. of ethanol of 95 percent strength by means of a palladium-calcium carbonate-catalyst. 0.26 gram of $\Delta^5$-pregnene-$3\beta$:$17\alpha$-diol-20-one are obtained having a melting point of 268° C.–271° C. (on the Kofler heating bench).

*Example 3*

130 milligrams of 16:17-oxido-$\Delta^4$-pregene-21-ol-3:20-dione-acetate are heated, for 1½ hours at 100° C., with 650 milligrams of sodium iodide in 2 cc. of glacial acetic acid. After working up as described in Example 2, there are obtained 145 milligrams of 16-iodo-$\Delta^4$-pregnene-$17\alpha$:21-diol-3:20-dione-21-acetate melting at 185° C.–187° C. (on the Kofler heating bench).

The same compound is obtained when heating 0.1 gram of 16:17-oxido-$\Delta^4$-pregnene-21-ol-3:20-dione-acetate for 1½ hours at 100° C., with 0.4 gram of sodium iodide in 2 cc. of formic acid. When working up as described in Example 2, the yield amounts to 92 milligrams.

The same compound is obtained when heating 0.1 gram of 16:17-oxido-$\Delta^4$-pregnene-21-ol-3:20-dione acetate for 1½ hours at 100° C., with 0.4 gram of potassium iodide and 0.4 cc. of water in 2 cc. of glacial acetic acid, while shaking occasionally. After working up as described in Example 2, there are obtained 70 milligrams of 16-iodo-$\Delta^4$-pregnene-$17\alpha$:21-diol-3:20-dione-21-acetate.

600 milligrams of 16-iodo-$\Delta^4$-pregnene-$17\alpha$:21-diol-3:20-dione-21-acetate are hydrogenated with 3 grams of a 2 percent palladium-calcium carbonate-catalyst as described in Examples 1 and 2. After recrystallization from 15 cc. of acetone, there are obtained 440 milligrams of $\Delta^4$-pregnene-$17\alpha$:21-diol-3:20-dione-21-acetate melting at 237° C.–238° C. (on the Kofler heating bench). From the mother liquor are obtained further 160 milligrams of the product melting at 234° C–235° C.

*Example 4*

0.8 gram of 16:17-oxido-progesterone are heated, for 1½ hours at 100° C., with 4 grams of sodium iodide in 10 cc. of glacial acetic acid. The reaction mixture is poured into 200 cc. of water and the precipitate is filtered off with suction. The precipitate is taken up in a little methylene chloride and, after drying with sodium sulfate, the solution is concentrated to two cubic centimeters. After adding 10 cc. of ether, 0.97 gram of 16-iodo-$17\alpha$-hydroxy-progesterone crystallize which melt at 188° C. (on the Kofler heating bench). By reduction with Raney nickel as described in Example 1, it is converted into $17\alpha$-hydroxy-progesterone.

We claim:

1. The process which comprises reacting 16:17-oxido-20-ketosteroids, with a member selected from the group consisting of an alkali and alkaline earth metal salt of hydrogen iodide and an excess of a member selected from the group consisting of carboxylic and sulfonic acids at a temperature of about 100° C., and transforming the iodohydrins thus obtained by reduction into 17-hydroxy-20-ketosteroids.

2. The process which comprises reacting 16:17-oxido-20-ketosteroids, with an alkali metal salt of hydrogen iodide and aliphatic carboxylic acids used in excess at a temperature of about 100° C., and transforming the iodohydrins thus obtained by reduction into 17-hydroxy-20-ketosteroids.

3. The process which comprises reacting 16:17-oxido-20-ketosteroids, with an alkali metal salt of hydrogen iodide and an excess of a low molecular weight aliphatic carboxylic acid at a temperature of about 100° C., and transforming the iodohydrins thus obtained by reduction into 17-hydroxy-20-ketosteroids.

4. The process which comprises reacting 16:17-oxido-20-ketosteroids with an alkali metal salt of hydrogen iodide and acetic acid in excess at a temperature of about 100° C., and transforming the iodohydrins thus obtained by reduction into 17-hydroxy-20-ketosteroids.

5. The process which comprises reacting 16:17-oxido-20-ketosteroids with an alkali metal salt of hydrogen iodide and formic acid in excess at a temperature of about 100° C., and transforming the iodohydrins thus obtained by reduction into 17-hydroxy-20-ketosteroids.

6. The process which comprises reacting 16:17-oxido-20-ketosteroids with sodium iodide and aliphatic carboxylic acids used in excess at a temperature of about 100° C., and transforming the iodohydrins thus obtained by reduction into 17-hydroxy-20-ketosteroids.

7. The process which comprises reacting 16:17-oxido-20-ketosteroids with sodium iodide and low molecular aliphatic carboxylic acids used in excess at a temperature of about 100° C., and transforming the iodohydrins thus obtained by reduction into 17-hydroxy-20-ketosteroids.

8. The process which comprises reacting 16:17-oxido-20-ketosteroids with sodium iodide and acetic acid in excess at a temperature of about 100° C., and transforming the iodohydrins thus obtained by reduction into 17-hydroxy-20-ketosteroids.

9. The process which comprises reacting 16:17-oxido- 20-ketosteroids with sodium iodide and formic acid in excess at a temperature of about 100° C., and transforming the iodohydrins thus obtained by reduction into 17-hydroxy-20-ketosteroids.

10. 16 - iodo - Δ⁵ - pregnene - 3β,17α - diol - 20 - one-3β-acetate having the configuration

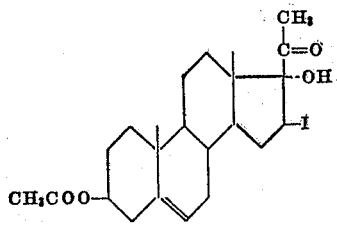

11. 16-iodo-Δ⁵-pregnene-3β,17α-diol-20-one having the configuration

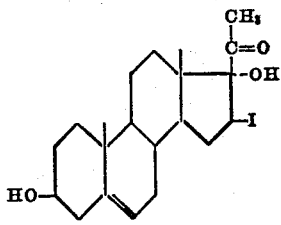

12. The process which comprises reacting

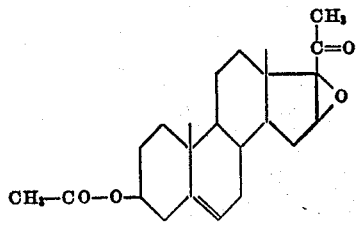

with sodium iodide and an excess of a low molecular weight aliphatic carboxylic acid at a temperature of about 100° C., and catalytically hydrogenating the iodohydrin thus obtained to produce

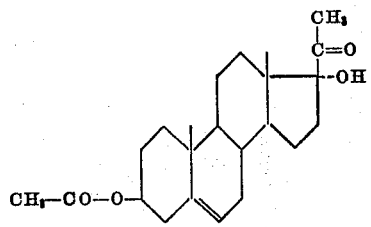

13. The process which comprises reacting

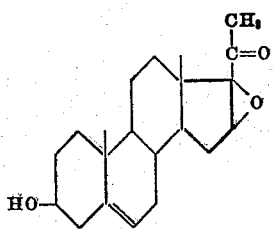

with sodium iodide and an excess of a low molecular weight aliphatic carboxylic acid at a temperature of about 100° C., and catalytically hydrogenating the iodohydrin thus obtained to produce

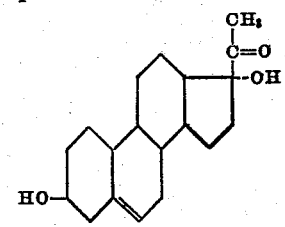

14. A compound having the general formula

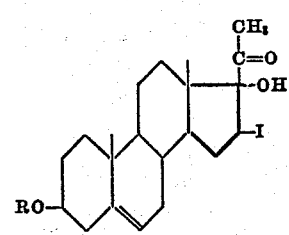

wherein R is a member selected from the group consisting of hydrogen and $CH_3$—CO—.

References Cited in the file of this patent
UNITED STATES PATENTS
2,602,804    Kendall _____ July 8, 1952

OTHER REFERENCES
Julian: Journal Am. Chem. Soc. 72, 5145–47 (1950).
Julian: Recent Advances in Hormone Research, vol. VI, pages 204–5 (1951).